United States Patent [19]
Weller

[11] Patent Number: 5,135,256
[45] Date of Patent: Aug. 4, 1992

[54] SIDE IMPACT BOLSTER ATTACHED TO SEAT BELT

[75] Inventor: Peter A. Weller, Holland, Mich.

[73] Assignee: Davidson Textron Inc., Dover, N.H.

[21] Appl. No.: 736,949

[22] Filed: Jul. 29, 1991

[51] Int. Cl.⁵ ............................................. B60R 21/04
[52] U.S. Cl. .................................... 280/751; 280/801
[58] Field of Search ................ 280/801, 808, 748, 751

[56] References Cited

U.S. PATENT DOCUMENTS

| | | | |
|---|---|---|---|
| 3,185,497 | 5/1965 | Lagace | 280/751 |
| 3,941,404 | 3/1976 | Otaegui-Ugarte | 280/751 |
| 4,272,103 | 6/1981 | Schmid et al. | 280/751 |
| 4,610,463 | 9/1986 | Efrom | 280/751 |
| 4,921,273 | 5/1990 | Weightman et al. | 280/808 |

Primary Examiner—Kenneth R. Rice
Attorney, Agent, or Firm—John P. Moran

[57] ABSTRACT

A bolster formed of suitable cushioning material attached to the lap belt portion of an automotive three-point seat belt system, wherein the lap belt portion of an automotive three-point seat belt system, wherein the lap belt portion is attached at one end thereof to the sill at the base of the center pillar. The bolster is sized and positioned so as to contact the outside edge of the front seat and the hip portion of the occupant, spaced apart from the vehicle door, providing cushioning between the occupant and the door. When the seat belt is not in use, the bolster assumed a stowed position along side the center pillar intermediate the base and the usual upper shoulder belt dispenser, providing for easy entry and egress by the operator or passenger.

5 Claims, 1 Drawing Sheet

SIDE IMPACT BOLSTER ATTACHED TO SEAT BELT

TECHNICAL FIELD

This invention relates generally to automotive side impact protection apparati and, more particularly, to a side impact bolster attached to the seat belt.

BACKGROUND ART

While various side impact protection apparati are known, none are known to be operative in conjunction with the lap belt portion of a conventional three-point seat belt system. Inflatable seat belts are known for affording added protection in the event of a frontal impact, for example, Abe et al U.S. Pat. No. 3,933,370; Granig U.S. Pat. No. 3,801,156; and Law et al Pat. No. 4,348,037.

Other arrangements known to be associated with seat belts include Weightman et al U.S. Pat. No. 4,795,190; Otaegui-Ugarte U.S. Pat. No. 3,941,404; and Pennock U.S. Pat. No. 4,886,318, but none of these are specifically directed to protection of the occupant in a side impact situation. Weightman et al disclose tubular covers around lap and shoulder belts for comfort while wearing the belts, and a minicover around the shoulder belt adjacent the neck and shoulder of the user to encourage seat belt use.

Otaegui-Ugarte discloses an air inflatable chest protector operatively connected to the safety belt adjacent the user's thorax and abdomen.

Pennock discloses attachments for each of twin shoulder belts, lap belts, and crotch belts, consisting of an elongated foam body and a fabric sleeve having a passage formed therethrough to permit free movement of the various safety belt portions.

Capener U.S. Pat. No. 3,623,768 discloses a seat related, but not lap belt-related, pair of pivotable arms, actuated by cylinder means to wrap around the occupant upon a severe impact to the vehicle coming from any direction about the horizontal periphery. An airbag mounted in the end of one of the arms inflates to a position between the arms, in front of the occupant.

DISCLOSURE OF THE INVENTION

A general object of the invention is to provide an improved automotive side impact protection apparatus.

Another object of the invention is to provide an improved side impact protection apparatus which is adaptable to the lap belt portion of a typical three-point seat belt system wherein the lap belt is fixed at the base of the center pillar of the vehicle, and the shoulder belt reels into a dispenser at the top of the pillar, with the buckle stowed adjacent the dispenser.

A further object of the invention is to provide a bolster, with a substantially triangular cross-sectional shape, fixedly attached to the lap belt such that the bolster fits into the space alongside the user's hip near his or her waist.

These and other objects and advantages will become more apparent when reference is made to the following drawings and the accompanying description.

BEST MODE OF CARRYING OUT THE INVENTION

Figure 1:
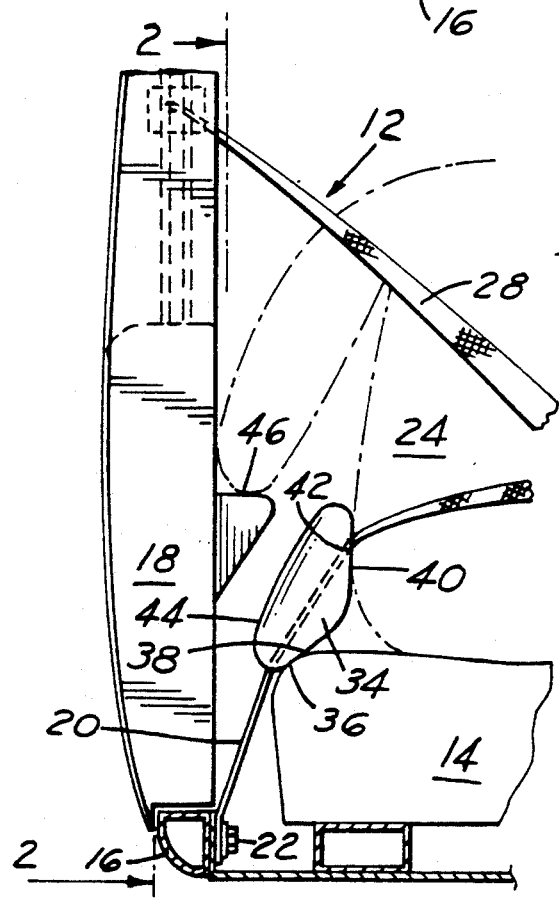
FIG. 1 is a fragmentary end view of a vehicle three-point seat belt system embodying the invention.

Referring now to the drawings in greater detail, FIG. 1 illustrates an automotive side impact protection apparatus 10 for use with a conventional three-point seat belt system 12, in conjunction with a front seat 14, a door sill 16, and a door 18. A lap belt portion 20 of the conventional three-point seat belt system 12 is secured at one end thereof by a suitable fastener 22 to the usual rocker panel or sill 16. The vehicle occupant seated on the seat 14 is represented as 24.

Figure 2:
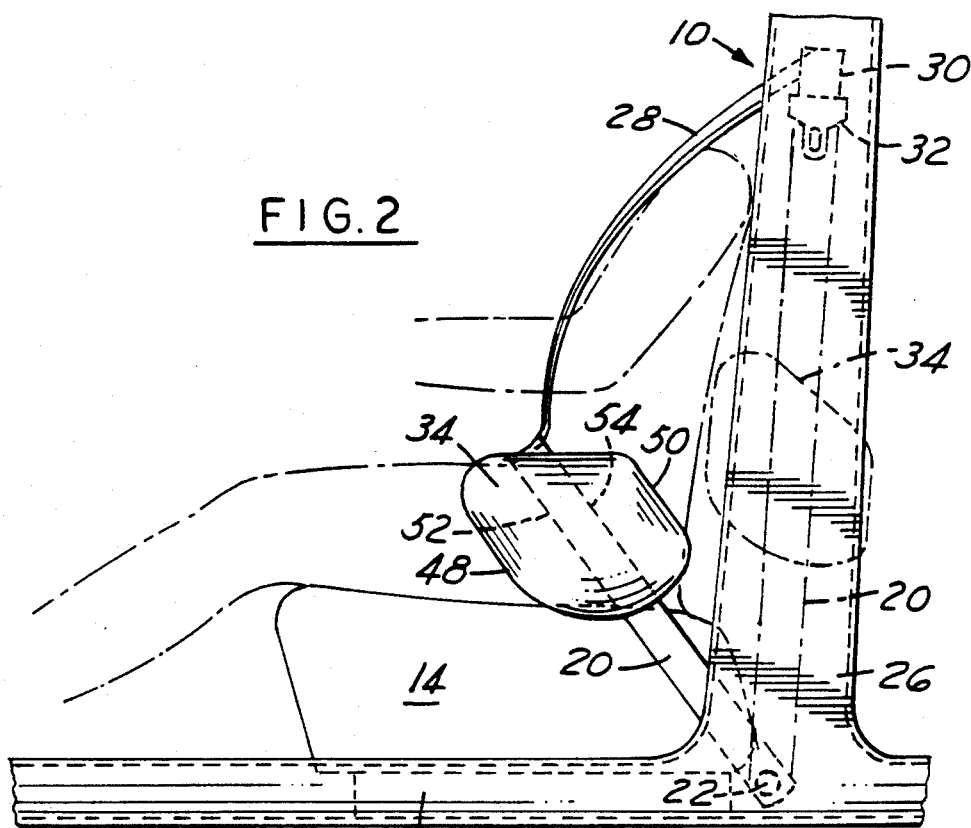
FIG. 2 is a fragmentary side elevational view taken along the plane of the line 2—2 of FIG. 1, and looking in the direction of the arrows.

As shown in FIG. 2, the fastener 22 on the sill 16 is positioned at the base of the usual center pillar 26. The shoulder belt portion 28 of the seat belt system 12 reels into a typical dispenser, represented as 30, at the top of the center pillar 26, with a typical buckle 32 stowed, when not in use, adjacent the dispenser 30.

A bolster 34 formed in somewhat of a triangular configuration, as viewed in FIG. 1 is fixedly secured around the lap belt portion 20 of the seat belt system 12, so as to engage at one side 36 thereof an edge portion 38 of the front seat 14, and at another side 40 thereof the hip 42 of the occupant 24. A further side 44 of the bolster 34 is spaced apart from the inner surface of the door 18, approximately adjacent an armrest 46 commonly mounted on the inner surface of the door.

As viewed in FIG. 2, the height of the bolster 34 is from the edge portion 38 of the seat 14 to approximately the belt line of the occupant 24, with the front 48 and the rear 50 surfaces of the bolster 34 substantially paralleling the front 52 and rear 54 edges of the lap belt portion 20.

The bolster 34 is formed of any suitable cushioning material. A preferred material is a vinyl skin covered, low density urethane foam formulated for high energy absorption.

As shown in phantom lines in FIG. 2, when not in use the bolster 34 has moved with the lap belt portion 20 to a mid location along the center pillar 26, out of the way, for easy entry and egress by the operator or passenger.

Industrial Applicability

It should be apparent that the invention provides a compact, efficient, and inexpensive side impact attachment to a lap belt which serves, in the event of a side impact, to assist the seat belt in retaining the occupant in position on the seat, restraining him or her from sliding toward the door, along with providing cushioning between the occupant and the inner door panel to reduce the movement of the door toward, and the resultant forces on, the occupant.

It should also be apparent that the invention is not cumbersome and does not interfere with the vehicle operator, and is stowable alongside the center pillar, out of the way, for easy entry and egress by the operator or passenger.

While but one embodiment configuration has been shown and described, other modifications thereof are possible within the scope of the following claims.

The embodiments of the invention in which an exclusive property or privilege is claimed are defined as follows:

1. A side impact protection apparatus for use with a lap belt portion of a seat belt secured to a door sill at the base of a center pillar adjacent an automotive front door by a vehicle occupant seated on a vehicle front seat and having the lap belt portion secured across his or her lap, said apparatus comprising a bolster fixedly mounted around the seat belt portion in the space intermediate said front door and the hip of said occupant.

2. The apparatus described in claim 1, wherein said bolster abuts against an edge of said front seat and said hip of said occupant.

3. The apparatus described in claim 2, wherein said bolster is substantially triangular in shape, with two sides thereof respectively engaging said front seat and said hip of said occupant, adjacent said front door.

4. The apparatus described in claim 1, wherein said bolster is formed of a suitable cushioning material having a slot formed therethrough for mounting around said lap belt portion.

5. The apparatus described in claim 4, wherein said cushioning material is a vinyl skin covered, low density urethane foam formulated for high energy absorption.

* * * * *